United States Patent [19]

Frommer et al.

[11] Patent Number: 5,314,968
[45] Date of Patent: May 24, 1994

[54] DISINFECTING RESIN

[76] Inventors: Moshe A. Frommer, 2a Eisenberg Street, Rehovot 76291; Israel Dalven, 1/3 Atar Yavneh, Emanuel 44854, both of Israel

[21] Appl. No.: 22,214

[22] Filed: Feb. 25, 1993

[30] Foreign Application Priority Data

Feb. 28, 1992 [IL]  Israel .................................... 101109

[51] Int. Cl.$^5$ ............................................. C08F 8/22
[52] U.S. Cl. ..................................... 525/356; 521/31; 525/332.2; 525/357
[58] Field of Search ................... 525/356, 357; 521/31

[56] References Cited

U.S. PATENT DOCUMENTS 3,316,173  4/1967  Mills et al. .
3,817,860  6/1974  Lambert et al. .
3,923,665 12/1975  Lambert et al. .
4,187,183  2/1980  Hatch .
4,190,529  2/1980  Hatch .
4,238,477 12/1980  Lambert et al. .
4,420,590 12/1983  Gartner .

OTHER PUBLICATIONS

Applied Microbiology, vol. 20, pp. 720-722 (1970).
Applied and Environmental Microbiology, vol. 44, pp. 1370-1373 (1982).
Industrial & Engineering Chem. Prod. Res. Dev., vol. 19, pp. 256-258 and 259-263 (1980).

*Primary Examiner*—Bernard Lipman
*Attorney, Agent, or Firm*—Keck, Mahin & Cate

[57] ABSTRACT

A polyhalide bactericidal resin, of the demand type, based on halogens, the preponderant being iodine. The release of iodine into the water which is purified is minimized, and contaminated water is rendered safe for human consumption.

There are also provided devices for the decontamination of contaminated water, based on the use of the novel resins of the invention.

Furthermore there is provided a process for the production of such resins based on the interaction of a strong base anion exchange resin, iodine, an iodine, a bromide and a persulfate oxidizing agent.

6 Claims, No Drawings

DISINFECTING RESIN

FIELD OF THE INVENTION

The invention relates to a novel bactericidal resin, to a process for its production and for devices incorporating same.

The novel devices, based on this resin are of special value in the disinfection of contaminated water, rendering it safe for use by humans.

Although based on a a variety of halogens, the preponderant being iodine, the composition of the novel resin is such that the release of iodine into the disinfected water is minimized. The novel polyhalide bactericidal resin is of the demand type.

BACKGROUND OF THE INVENTION

The use of strong base ion-exchange resins saturated with polyhalide, notably tri- and pentaiodide counter ions has been heretofore known in the art of water disinfection. Bacterially contaminated water, when contacted with a suitably prepared such polyhalide resin for sufficient time, is thereby disinfected.

The disinfection is a result of direct contact with the resin, the residual halogen in solution being insufficient to alone provide disinfection. The resins are to varying extents, "demand type" disinfectants, killing on contact.

References in the prior art to such iodated resins include U.S. Pat. Nos. 3,817,860; 3,923,665; 4,187,183; 4,190,529; 4,238,477 and published articles in Applied Microbiology, vol. 20, pages 720-722 (1970); ibid., vol. 44, pages 1370-1373 (1982); Industrial & Engineering Chemistry, Prod. Res. Dev. vol 19, p. 256-258 and 259-263 (1980); and Water Technology, pages 26-33, October 1987, pages 14-18, February 1988 and pages 65-67 August 1990.

Prior to the above mentioned disclosures, the use of interhalogens absorbed on ion exchanger resins was limited by severe halogen leakage from said resins, as reprted in U.S. Pat. No. 3,316,173, rendering further treatment necessary to obtain potable water. The above disclosures thus represent a significant advance in the art.

Nonetheless, it was soon recognized that the release of halogen atoms as ions or free halogen remained a major drawback to the use of bactericidal resins in other than emergency situations. This problem is addressed directly in U.S. Pat. No. 4,420,590, wherein it is generally claimed that the addition of specific small amounts of bromide ions, partially replacing triiodide resins with interhalogen ions such as $I_2Br^-$, significantly reduces the level of halogen release, which it is claimed, provides a more physiologically acceptable product. It has been found, however, that when using tap water at the upper range of total disolved solids allowed by regulatory agency regulations in most countries, (i.e. over 800 ppm TDS) the level of iodine in the effluent of resins made according to the teachings of U.S. Patent '590 is above the desirable level, as described below.

Use of free bromine ($Br_2$) in the manufacturing process could increase the amount of inter-halogen moieties in the finished product. This would serve the dual role of reduced iodine elution and reducing production cost, which has been a significant factor in limiting the use of disinfecting resins. Bromine and its compounds are much less expensive than the corresponding iodide compounds. However, the additional cost and difficulty of handling elemental bromine make this impractical in application. The goal of the present invention is the in situ, generation of bromine, allowing practical use of bromide compounds to produce a resin with high disinfection power and low iodine elution and lower in cost than the materials known currently in the art.

Thus the prior art, while recognizing the existence of unacceptable elution of halogens in the heretofor known polyhalide disinfectant resins, does not reveal a solution to this problem, generally applicable over the range of acceptable and commonly found levels of total dissolved solids (TDS) in drinking water. It would be highly desirable to have such a resin, which could be used for extended periods by most sections of the population in areas succeptable to microbial contamination, and at a price lower than that currently possible.

SUMMARY OF THE INVENTION

The invention relates to a polyhalide bactericidal resin, of the demand type, which comprises a relatively large quantity of mixed iodides and polyhalides, yet which releases only small quantities of iodine and other halogens into the disinfected water. The invention further relates to a process for the production of such resins, and to the product resulting from such process. The invention furthermore relates to water purification and disinfection systems which comprise a resin of the present invention.

Water is disinfected by contacting it with the novel resin, advantageously when passed through a bed of such resin, which may be provided in column form. The resulting water contains only small quantities of iodine, and can be used either as such, or after a post-treatment to remove traces of iodine.

The disinfected water is essentially free of contaminating micro-organisims and safe for human consumption.

The novel resins are produced by contacting in an aqueous medium a strong base anion exchange resin with iodine, a water soluble iodide, a water soluble bromide, and a suitable oxidant such as a peroxide oxidant.

According to the preferred embodiment of the invention, the resin is contacted with a concentrated solution of iodine, an alkali metal iodide, an alkali metal bromide and a persulfate oxidant.

One of the such preferred embodiments of the process of the invention comprises contacting a strong base anion exchange resin with iodine, potassium iodide, potassium bromide and a monopersulfate oxidant. Preferably, the quantity of the iodide is about three times the quantity of the bromide by weight.

The peroxide oxidant of choice is monopersulfate, which is commercially available, and which can be produced by the interaction of 1 mole potassium peroxymonosulfate per 0.5 mole each of potassium bisulfate and potassium sulfate.

Other suitable iodides and bromides are the sodium and ammonium salts.

Monopersulfate oxidant is available under the commercial designation from DuPont de Nemours Inc. under the Trade Name "Oxone".

The mixture of the preferred embodiment results in the formation of a complex mixture of interhalogens, which is believed to comprise $I_3^-$, $IBr_2^-$ and $I_2Br^-$, which are readily absorbed by the ion exchange resin, giving a complex which is believed to contain as the interaction product with the cations of the resin, ions of the polyiodide type such as $IBrCl^-$, $I_2Cl^-$, $I_3^-$, $IBr_2^-$, and $I_2Br^-$.

It is believed that the existnce of Oxone in the reaction mixture leads to complexed bromine on the resin, as detailed above, which obviates the handling of bromine as such.

The following examples are illustrative of the invention, and are not to be construed in a limitative manner.

EXAMPLE 1

200 gr. of elemental iodine, 100 gr. of potassium iodide and 95 ml of water are mixed until a solution is obtained, after which 40 gr of potassium bromide is added and thoroughly mixed. 45 gr. of "Oxone" is then added and mixed for one hour. While mixing, 0.7 liters of a strong base ion exchange resin, such as Ionac ASB1-P is added and mixing continued one hour, followed by standing overnight. The resin is then rinsed thoroughly with deionized or low salinity water (such as RO water) while mixing until the electrical conductivity of the rinse water and the feed water are equivalent. The resin is then drained of excess water.

The foregoing ratio of weights is based on the milliequivalent wet total exchange capacity of the resin, which in this example was 1.3 meg/ml. This formulation results in a polyhalide complex of iodine, bromine and chlorine atoms. In Example 1, the ratios of the ingredients utilized in the preparation of the novel polyhalide bactericidal strong base anion exchange resins made and utilized in accordance with our present invention are as follows:

|  | Weight Ratios | Mole Ratios | Weights |  |
|---|---|---|---|---|
| Iodine | .415 | .866 | 200 gr |  |
| KBr | .083 | .369 | 40 |  |
| KI | .207 | .662 | 100 |  |
| Oxone | .093 | .080 | 45 |  |
| Water | .197 |  | 95 |  |
| Starting Resin | 1 | 1 | 482 gr $\approx$ 0.7 liters |  |

In a manner similar to that described in example 1, there were prepared the following examples using the weights of the resin components indicated below.

EXAMPLES 2-10

|  | 2 | 3 | 4 | 5 | 6 |
|---|---|---|---|---|---|
| I2 | 200 gr | 200 gr | 200 gr | 180 gr | 180 gr |
| KI | 90 | 100 | 110 | 110 | 110 |
| KBr | 45 | 45 | 35 | 35 | 40 |
| Oxone | 45 | 45 | 45 | 40 | 45 |
| Water | 95 | 90 | 100 | 90 | 95 |
| Resin | 482 | 482 | 482 | 482 | 482 |

|  | 7 | 8 | 9 | 10 |
|---|---|---|---|---|
| I2 | 180 gr | 220 gr | 220 gr | 220 gr |
| KI | 110 | 90 | 90 | 90 |
| KBr | 45 | 35 | 40 | 45 |
| Oxone | 45 | 40 | 40 | 40 |
| Water | 100 | 90 | 100 | 110 |
| Resin | 482 | 482 | 482 | 482 |

EXAMPLE 11

200 gr. of elemental iodine, 90 gr. of sodium iodide and 95 ml of water are mixed until a solution is obtained, after which 34.6 gr of sodium bromide is added and thoroughly mixed. 45 gr. of "Oxone" is then added and mixed for one hour. The procedure of Example 1 is then followed with the addition of 0.7 liters (482 gr) of Ionac ASB1-P.

Of the foregoing examples, Example 1 represents a preferred embodiment. The others are operable embodiments of the invention, resulting in bactericidal resin which are all an advance in the art.

The resin of Example 1 was compared for iodine elution with compositions prepared according to the previous art as disclosed in U.S. Pat. Nos. 4,187,183 and 4,420,590 using the preferred compositions described therein. The test was done using identical cartridges each containing 120 ml of resin with a length to diameter ratio of about 3.4. Tap water was passed through the cartridges at a rate of 1 liter per minute, providing a real residence time of about 2.4 sec (based on 33% void volume). After an initial flush, samples were taken at 10 liter intervals and examined by the Leuco Crystal Violet colorimetric method for iodine.

| Effluent Volume | Example 1 | '590 | '183 |
|---|---|---|---|
| 0 | 2.54 mg/l | 5.70 mg/l | 10.19 mg/l |
| 10 | 3.45 | 5.94 | 11.87 |
| 20 | 3.45 | 5.68 | 13.42 |
| 30 | 3.27 | 5.85 | 13.65 |
| 40 | 2.81 | 5.90 | 14.70 |
| 50 | 3.74 | 6.40 | 16.02 |

In a further series of tests, the resin of the present invention was compared for its total iodine and total bromine elution to that of '590 in its preferred embodiment. One volume of resin was positioned above two volumes of activated carbon in a glass column so that the column height to diameter ratio for the resin was 3.7. Tap water with a specific conductivity of 340 $\mu$s/cm was passed through the columns to give a residence time of 2.0 sec. The effluents, from which free halogens were absent, were tested for iodide ion concentration by the Leuco Crystal Violet method and for bromide ion concentration by the phenol-red colorimetric method.

|  | $I^-$ | $Br^-$ |
|---|---|---|
| '590 | 0.18 ppm | 5.1 ppm |
| Example 1 | 0.18 | 2.0 |

To compare the resin of the present invention to prior art resins with regard to bactericidal activity, sewage, after secondary treatment, was passed over cartridges containing 750 ml each of resins prepared according to the present invention and according to Example 1 of U.S. Pat. '590. The initial flow rates were about 6.6 l/min. Samples were taken after 45 and 90 min at flow rates of 6.0 and 5.3 l/min respectively, providing residence times of 2.5 and 2.8 seconds.

| BACTERIA COUNT/100 ml AFTER 45 min/90 min | | | |
|---|---|---|---|
|  | Feed | '590 | Present Invention |
| Coliform | 10,000/18,000 | 850/2,000 | 800/800 |
| Enterococci | 800/1,200 | 680/950 | 350/300 |
| E. Coli | 2,000/6,000 | <10/30 | <10/40 |
| Fecal Coliform | 4,000/6,000 | <10/30 | <10/50 |

In a test of a device incorporating the disinfecting resin of Example 1 in a practical application, bacterially contaminated water was passed through a filter system consisting of a 25$\mu$ 10 inch prefilter and housing, a 10 inch disinfectant filter composed of a 5$\mu$ prefilter and 325 ml of the resin of Example 1 in a 10 inch housing; and a 10 inch GAC (granulated activated carbon) filter and housing. Flow controllers, limiting the flow to approx. 2 l/min per system, independent of inlet pressure was placed after the system. Feed water was provided by either the water mains or by a centrifugal pump connected to a 120 liter reservoir containing arificially contaminated water. The reservoir was filled with tap water, dechlorinated by passage through a GAC filter to which test bacteria were then added. Total accumulated water volume passed through the system was monitered by a meter at the entrance.

Bacterial testing was done according to a schedule including periods of constant tap water flow (to examine the resin's overall capacity) after which water artificially contaminated by about $10^5$ CFU (Colony Forming Units) of Enterobacter aerogenes (ATCC 15919) were passed through the system, and periods of stagnation.

The results shown in Table 1 demonstrate that the present invention provides an improved demand type bactericidal resin, displaying high capacity to kill bacteria while lowering the iodine level in the effluent water to a considerable extent, and displaying a minimal amount of bromide elution.

While the functional advantages of demand type disinfecting resins have been known for many years, their use has been limited due to the high cost of their manufacture, which requires large amounts of iodine. The economic advantages of the novel resin are based on the substitution of a significant portion of the iodine by far cheaper bromide compounds. The novel use of potassium bromide and "Oxone" to produce the bromine in situ from these inexpensive commercial ingredients, results in additional savings in expensive specialized equipment, which would be required for handling elemental bromine. Thus, the present invention is advantageous over prior art in that it allows the use of demand bactericidal resins in applications which could not justify the best of prior art materials.

The resins of the present disclosure are believed to contain a complex mixture of interhalide ions. This mixture is fundamentally different from interhalogen complexes theoretically or possibly present on the resin prepared according to the teachings of U.S. Pat. No. 4,420,590. It is known to those skilled in chemistry that the action of monopersulfate oxidant on the aqueous mixture of $I_2$, $I^-$ and $Br^-$ results in the formation of $IBr$ and $IBr_2^-$, among others, species which cannot readily be derived from the formulation described in the former art due to the unfavorable equilibria encountered in the formation of $IBr_2^-$ from $I_3^-$ and $Br^-$ or from $I_2$ and $Br^-$. Only such species, $IBr$ and $IBr_2^-$, when contacted with strong base ion exchange beads, in the chloride form provide stable bromine containing complexes which produce the improvements of the current invention.

TABLE I

Results of Long-Term Testing of a Device, Including Periods of Constant Tap-Water Flow and Periods of Stagnation.

| Day | Accum. hrs. of Operation | Stagnation Hours | Volume | cfu/ml Enterobacter aerogenes (ATCC 15919 Contaminated Water[a] test Product | feed | iodide[b] conc, ppm Product |
|---|---|---|---|---|---|---|
| 1 | ≈ 1 | | 100 l | 0 | $10^5$ | 4.0 |
| 2 | 30 | | 3,600 | 0 | $10^5$ | 4.4 |
| 4 | 78 | | 9,400 | 0 | $10^5$ | 4.1 |
| 7 | 78 | 48 | 9,400 | 0 | $10^5$ | 5.7 |
| 9 | 125 | | 15,000 | 0 | $10^5$ | 3.5 |
| 11 | 125 | 48 | 15,000 | 0 | $10^5$ | 5.4 |
| 12 | 155 | | 18,600 | 0 | $10^5$ | 3.4 |
| 17 | 202 | | 24,200 | 0 | $10^5$ | 3.0 |
| 22 | 266 | | 31,900 | 0 | $10^4$ | 2.9 |
| 23 | 266 | | 31,900 | 0 | $10^5$ | — |

[a] The temperature of the water during the contaminated water tests was 28 ± 0.5° C.
[b] No free iodine (<10 ppb) was observed in the product water.

We claim:
1. A process for the production of a bactericidal resin, which comprises:
    contacting a Styrene-DVB based strong base granular anion exchange resin of total capacity of at least 1.0 equivalent/liter with a mixture prepared from elemental iodine, a soluble iodide, a soluble bromide, water and a peroxymonosulfate oxidant, wherein the iodine to iodide mole ratio is more than 1 to 1 and the iodide to bromide mole ratio is at least 1.5 to 1 and the oxidant is sufficient to convert more than half the bromide to bromine,
    agitating for a certain period of time, followed by a reaction period, and
    rinsing.
2. A process according to claim 2, comprising contacting the ion-exchange resin with iodine, potassium iodide, potassium bromide and a monopersulfate oxidizer, wherein the iodide to bromide weight ratio is from about 2 to 1 to about 3 to 1.
3. A process according to claim 2, comprising reacting an alkali metal peroxymonosulfate, alkali metal bisulfate and alkali metal sulfate to produce monopersulfate oxidizer.
4. A process according to claim 3, wherein the alkali metal in the peroxymonosulfate, alkali metal bisulfate and alkali metal sulfate is potassium.
5. A process according to claim 1, where the substances interacted are in a molecular ratio of:

| | | | |
|---|---|---|---|
| Elemental Iodine ($I_2$) | .79 | to | .95 |
| Iodide | .60 | to | .73 |
| Bromide | .33 | to | .41 |
| Oxidizer (as O) | .14 | to | .18 |
| Water | | 5.80 | |
| Starting strong base resin | | 1 | |

6. A process according to claim 1, where the reactants are used at approximately the following weight ratios:

| | |
|---|---|
| Elemental Iodine | .415 |
| Potassium Iodide | .207 |
| Potassium Bromide | .083 |
| "Oxone" Oxidizer | .093 |
| Water | .197 |
| Starting strong base resin | 1.000 |

* * * * *